United States Patent [19]

Rochelle

[11] 4,155,669
[45] May 22, 1979

[54] DEEP WATER REPAIR METHODS AND APPARATUS

[75] Inventor: William R. Rochelle, Houston, Tex.

[73] Assignee: Brown & Root, Inc., Houston, Tex.

[21] Appl. No.: 881,026

[22] Filed: Feb. 24, 1978

[51] Int. Cl.² ............................................... F16L 1/00
[52] U.S. Cl. .................................... 405/158; 405/169
[58] Field of Search ................ 61/110, 111, 112, 107, 61/108, 105, 69 R; 294/66 R; 405/158, 165, 166, 168, 169

[56] References Cited

U.S. PATENT DOCUMENTS

| 3,578,233 | 5/1971 | Meister | 61/111 |
| 4,028,903 | 6/1977 | Dietrich | 61/110 |
| 4,050,955 | 9/1977 | Southgate | 61/112 |

*Primary Examiner*—Jacob Shapiro
*Attorney, Agent, or Firm*—Kenway & Jenney

[57] ABSTRACT

The invention relates to methods and apparatus for effecting deep water repair of pipelines especially during a pipelaying operation. A damaged portion of the pipeline is located and is prepared for receiving a pipeline plug member by cutting away the damaged portion leaving a prepared pipeline end section. The pipeline plug member is secured in a submersible repair frame which is lowered from a floating vessel into an operational relationship with the prepared pipeline end section. The plug member is aligned with the pipeline end section and is inserted into the end section. Thereafter, the plug member is sealingly secured in the pipeline end section and the repair frame is removed from its operational relationship with the pipeline. The pipeline is dewatered and the end section is then raised onto a floating vessel. The repair frame, in addition to including means for holding and manipulating the plug member, also has a manually operable control panel manipulating means for controlling operations of the repair frame, and a submersible vehicle docking station to position a submersible vehicle in an operative relationship to the control panel manipulating means. The repair frame is preferably lowered to the bottom of the body of water with a pick up line or a pilot line attached to the plug member.

36 Claims, 14 Drawing Figures

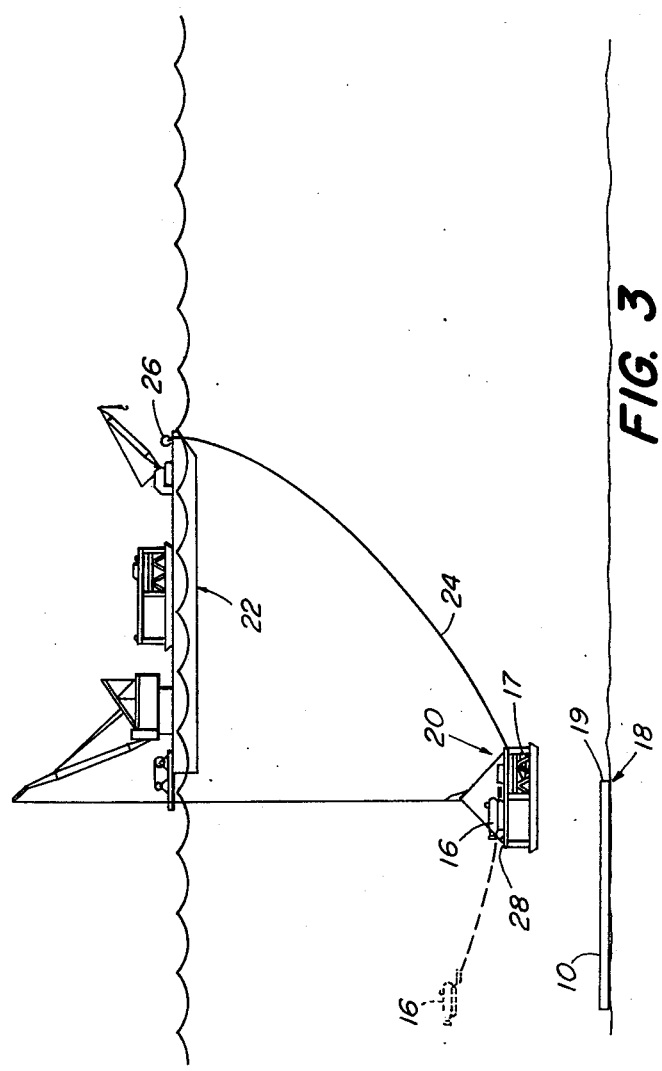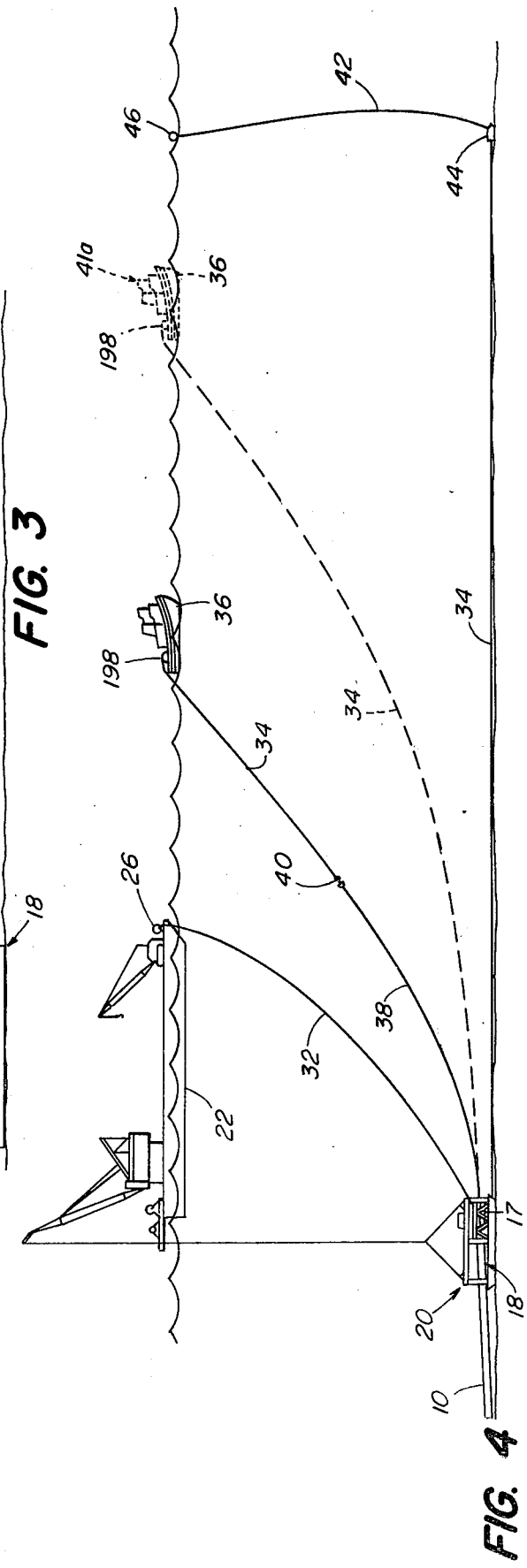

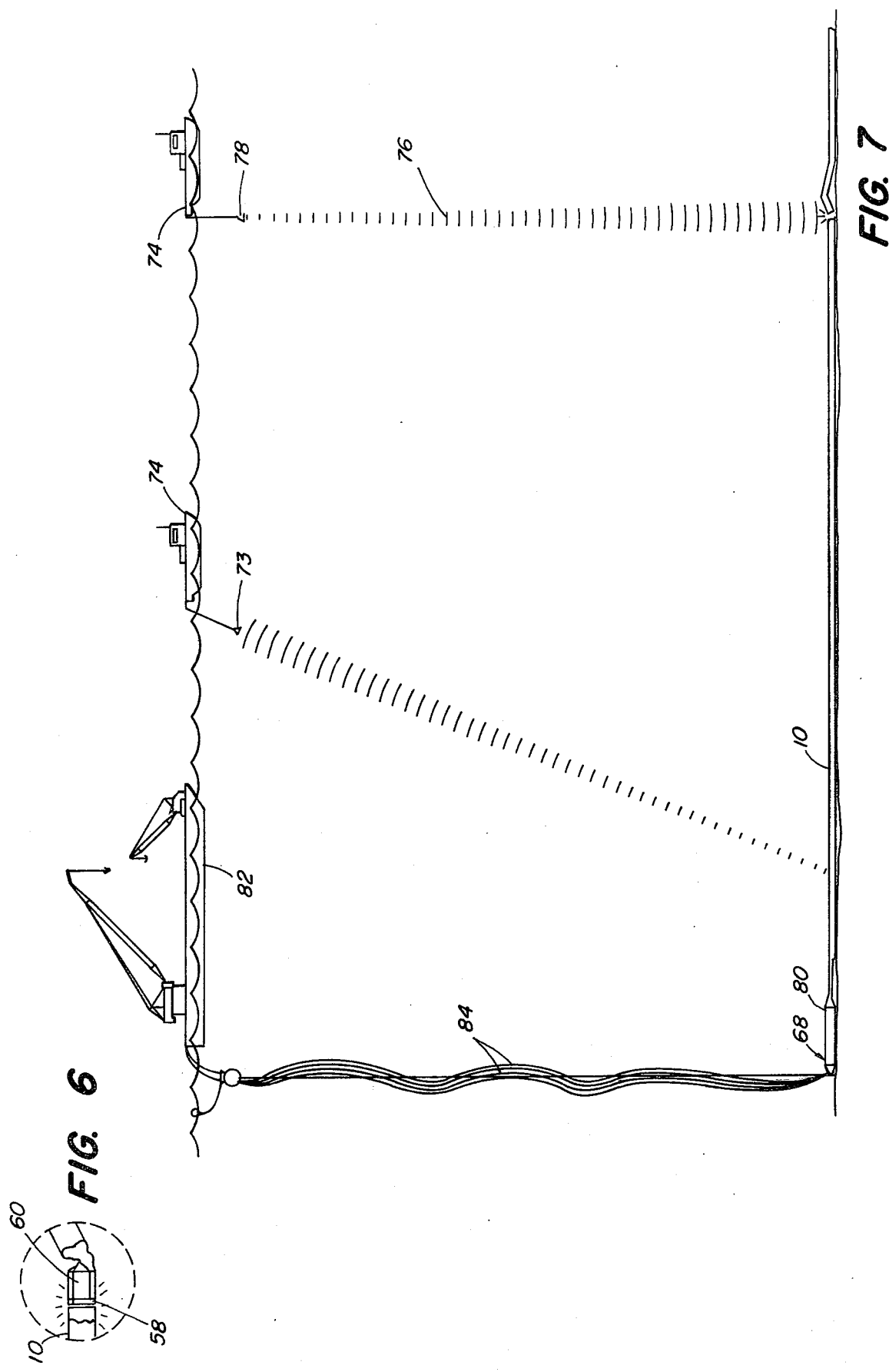

DEEP WATER REPAIR METHODS AND APPARATUS

This invention relates to methods and apparatus for effecting repair of elongated pipeline underwater and in particular to methods and apparatus for repairing a wet buckle in a damaged underwater pipeline in deep water.

BACKGROUND OF THE INVENTION

In recent years, oil and gas well exploration have ventured into increasingly deeper waters. As a result, we now have pipeline laid at depths far exceeding the limits at which divers can safely and/or easily work. Consequently, in response to the needs of the industry, new generations of equipment and methods to lay and maintain pipeline have been developed.

In particular, equipment and methods have been developed to repair breaks or "wet buckles" which may occur in the pipeline at deep water depths. Typically, either a totally remote, unmanned repair apparatus or an apparatus which includes a submersible diving bell has been used for this purpose.

These methods and apparatus have not proven totally satisfactory from either a cost or efficiency viewpoint. In particular, these earlier methods and apparatus have not provided the flexibility, maneuverability, and ease of handling which the cost conscious offshore petroleum industry must have.

It is therefore an object of this invention to provide improved methods and apparatus for repairing a break or wet buckle in an elongated pipeline lying in deep water. Another object of the invention is to provide methods and apparatus for repairing a break or wet buckle which occurs while the pipeline is being laid.

Other objects of the invention include providing a method and apparatus which does not require diver assistance, which is reliable, which accomplishes the manipulations required to effect pipeline repair both efficiently and precisely, which enjoys a large degree of flexibility and maneuverability, and which is easy to control from a submersible vehicle.

SUMMARY OF THE INVENTION

The invention relates to methods and apparatus for repairing a damaged pipeline member on the bottom of a body of water. The method features the steps of locating the damaged section of the pipeline member; preparing the damaged pipeline for receiving a pipeline plug member at a prepared pipeline end section; securing the pipeline plug member to a submersible repair frame; lowering the repair frame from a floating vessel with the plug secured thereto into an operational relationship with the prepared pipeline end section; aligning the plug member and the pipeline end section with each other; inserting and then securing the plug member in the pipeline end section; raising the repair frame out of the operational relationship with the pipeline and away from the pipeline; and raising the pipeline end section onto a floating vessel.

In particular embodiments of the method of the invention, there are featured the steps of attaching a flexible line between the plug member and a surface vessel; and maintaining the plug member, with the flexible line connected thereto, in its secured position during the lowering step. The method further features the step of replacing the flexible line with a pick-up line for lifting the pipeline end section from the water bottom and onto the vessel. The method also features the steps of providing a manual control panel manipulating means on the frame to control the operation of the frame and for aligning the pipeline plug member with and for inserting the member into the pipeline end section, and providing a submersible vehicle having means to operate the manual manipulating means. The method in a preferred embodiment further includes the step of elevating the pipeline end section above the water bottom against an inverted V-shaped structural section of the repair frame to place the pipeline in a known, predetermined alignment position.

The damaged pipeline may be prepared by explosively cutting the pipeline at the damaged section to prepare the section for receiving the pipeline plug member. In a preferred embodiment of this aspect of the invention, the cutting step comprises the steps of installing an internal cutoff pig in the pipeline with an activated pinger; pumping the cutoff pig through the pipeline until it reaches the damaged pipeline section, and tracking the cutoff pig during the pumping step.

In another aspect, after the damaged portion has been found, a cutoff frame member may be lowered from a floating vessel into an operational relationship with the damaged pipe-line section. The damaged pipeline end may be lifted off the water bottom using the cutoff frame and the damaged section removed, after explosive cutting, from the vicinity of the pipeline.

After the plug member has been secured within the internal portion of the pipeline, the pipeline is preferably evacuated of water, for example, by pumping a pig through the pipeline and expelling water through a closeable passage in the plug member.

The apparatus, according to the invention, for effecting repair of the damaged pipeline member features means for locating the damaged portion of the pipeline member and means for cutting away the damaged portion of the pipeline member leaving at least a prepared pipeline end section exposed to the water environment. A pipeline plug member having an outside diameter smaller than the inside diameter of the pipeline member in a first insertion stage, and having means actuatable for securing the plug within the pipeline in a second secured state are provided, and the plug is securely held by a submersible repair frame. The submersible repair frame further has means for raising and securely holding the pipeline end section in a known position; means to orient and align the pipeline plug member in an axial alignment with the raised and secured pipeline section; and means to insert the aligned plug member into the pipeline end section. The apparatus further comprises at least one floating vessel and means for lowering the repair frame, with the plug, to the bottom of the body of water in an operative relationship with the pipeline end section.

In a preferred embodiment, the submersible repair frame further includes a manually operable control panel manipulation means for controlling operation of the repair frame, including the raising, holding, orienting, and inserting means. The repair frame is further equipped with a submersible vehicle docking station to position a submersible vessel in an operative relation to the manually operable control panel manipulation means. The submersible vessel has means to operate the control panel manipulation means. The apparatus may also feature a flexible line connected between the floating vessel and the pipeline plug, the flexible line having been connected to the plug prior to lowering the repair frame.

In another aspect of the invention, the apparatus includes an internal pig, means for pumping the internal pig through the pipeline until it reaches and stops at the damaged pipeline section, and means to track the internal pig, for example, using hydrophones. The pig in one embodiment includes, at an after portion, an internal shaped charge for cutting, in response to an external control command, the damaged section of the pipeline member from the inside of the pipeline.

In another aspect, the apparatus may further feature a cutoff frame member having means for lifting an end section of the damaged pipeline above the water bottom and for cutting the damaged section from the pipeline. The cutoff frame member may be lowered to and raised away from its operating relationship with the pipeline. The repair frame may further include a plurality of thrusters to aid in aligning the repair frame with the pipeline as it is lowered to the water bottom. The repair frame preferably also features an inverted V-shaped structural section within which the pipeline is aligned as it is elevated or raised above the water bottom.

DESCRIPTION OF THE DRAWINGS

Other objects, features and advantages of the invention will appear from the following description of particular preferred embodiments of the invention taken together with the drawings in which:

FIG. 2 is a schematic illustration showing the pipeline as it extends from an above surface location and including a vessel to track an internal pig and to detonate an explosive charge;

FIG. 3 is a schematic illustration showing the lowering of a repair frame from a surface vessel according to the invention;

FIG. 4 is a schematic illustration showing the illustration of a pick up line and its subsequent testing and buoying;

FIG. 6 is an exploded view of an internal cutoff pig after it reaches the wet buckle and has stopped;

FIG. 7 is an illustration showing the use of an underwater pig launcher during pipeline repair and including a vessel to track the internal pig and to detonate an explosive charge;

DESCRIPTION OF PARTICULAR PREFERRED EMBODIMENTS

Figure 1:
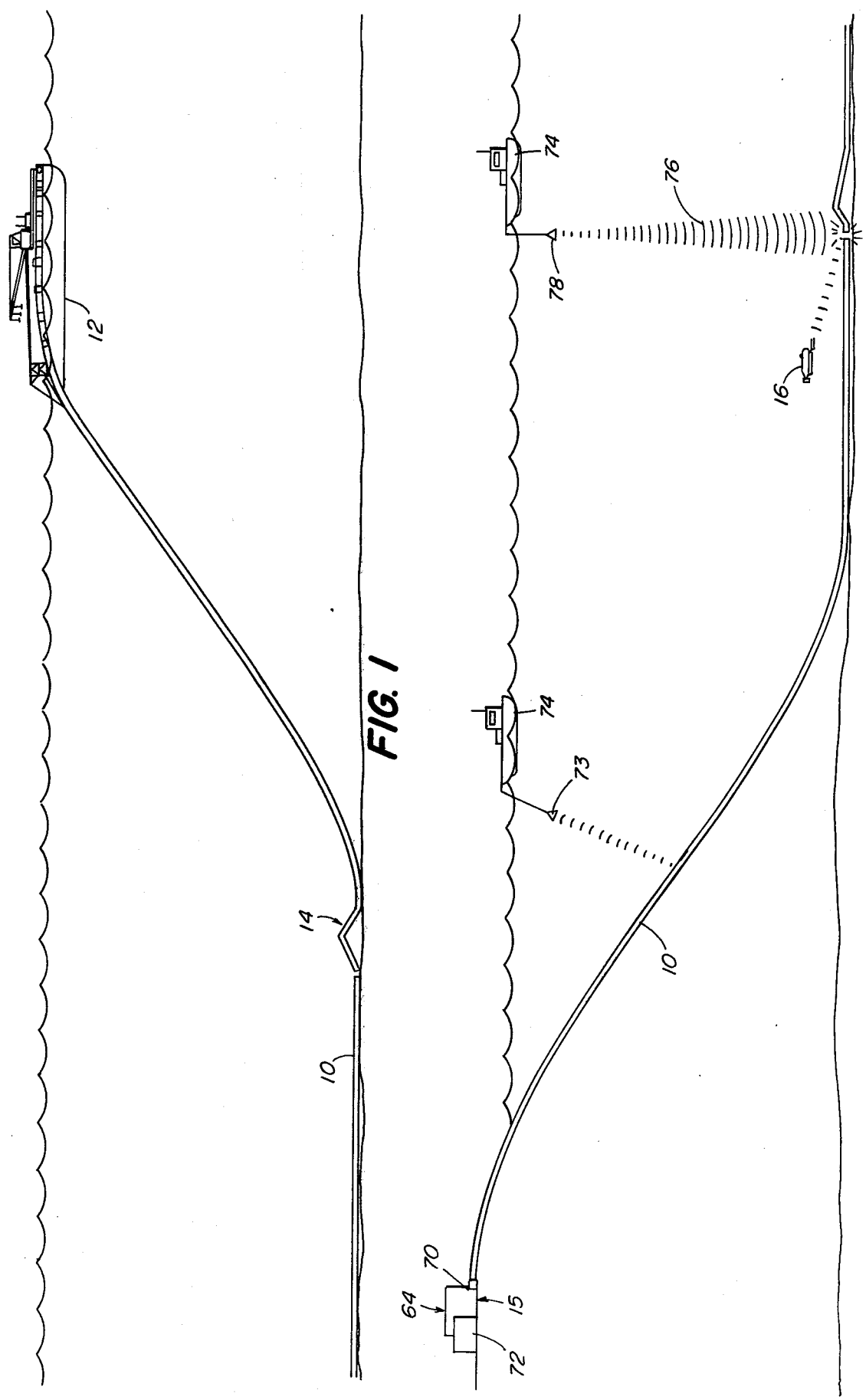
FIG. 1 is a schematic illustration of a break occurring during a pipelaying operation.

Referring to FIG. 1, during a pipelaying operation, wherein an elongated pipeline 10 is payed out from a pipelaying vessel 12 as described for example in Rochelle et al, U.S. Pat. No. 3,507,126, issued Apr. 21, 1970, a wet buckle 14 may develop as a result of the bending and other stress forces acting on the pipeline. The buckle, generally a structural break in or fracture of the pipeline, should be repaired before construction of the pipeline can be continued. The present invention is directed to methods and apparatus for effecting repair of the wet buckle, and is especially useful when the buckle occurs at depths at which divers cannot easily or conveniently work.

Referring to FIG. 2, in a representative pipelaying situation, the pipeline 10 extends from an onshore location 15 along the bottom of a body of water. The buckle 14, which may occur miles from the nearest land mass, and at a depth of 3000 feet or more, usually results in a fracture of the pipeline so that water fills the pipeline in both directions from the pipeline fracture.

Assuming that the buckle occurred as the pipeline was being laid as shown in FIG. 1, the free end of the pipeline is first lowered to the water bottom and the pipelaying vessel or barge 12 often leaves the vicinity of the buckle so that it will not interfere with the subsequent repair effort.

According to the invention, the next step in effecting the repair of the pipeline is to accurately locate the buckle. While the location of the buckle may be determined in several ways, one preferred method is to use a pipeline pig provided with a "pinger" (i.e. an acoustical position indicating device). Alternatively, a manned submersible for example, a submarine 16, could be used to locate the buckle in the pipeline and to mark the location with a pinger.

Referring to FIG. 3, after the pipeline buckle location has been marked, the damaged pipeline is prepared to receive a plug member 17 by which it will be pulled to the surface. According to the invention, the damaged section is cut or severed, leaving a prepared end section 18 having a substantially clean and smooth edge 19 to receive the plug member 17. The damaged section may be prepared, that is, cut away, in any one of a variety of ways, described below, depending on the construction of the pipeline. After the damaged section has been severed, it is removed from the vicinity of the pipeline so that it will not interfere with the repair operation.

Still referring to FIG. 3, after the pipeline 10 has been prepared at end section 18, a repair frame 20 is lowered from a floating vessel such as a barge 22 into an operational relationship with the pipeline. Secured within the repair frame 20 is the plug member 17 having a flexible line 24 attached thereto. Flexible line 24 may be a relatively light duty pilot line or it may be a relatively strong pick up line, for example a heavy duty service cable. The other end of line 24 is connected, for example, to the barge 22 and, in particular, may be wound around a drum member 26 which is secured to the bow of barge 22. Repair frame 20 includes a submersible vehicle docking station 28 at which a submersible vehicle, such as manned submarine 16, may dock and control the operation of the repair frame as described below.

Referring to FIG. 4, the repair frame, in its operational relationship with pipeline 10 at the prepared end section 18 thereof, raises and securely holds the pipeline end section above the water bottom and aligns it and the plug member 17 axially. Once alignment has been achieved, the plug member 17, which during this time has an outside diameter which is less than the inside diameter of the pipeline, is inserted into the prepared end section 18 of pipeline 10, and is secured within that end section, for example, by hydraulically actuated restraints which frictionally engage the interior portion of the pipeline end section. After the plug member is inserted into the pipeline end section, the pipeline is released from frame 20 and the frame is retrieved or raised from its operational relationship with pipeline 16.

In a preferred embodiment of the invention, flexible line 24 is a pilot line 32 and prior to retrieving the repair frame, the pilot line is taken in by drum member 26 and a pick-up line or heavy duty service line 34 is thereby pulled from a floating vessel, for example, from a small vessel 36 to plug member 17. The pick up line is connected to an extended portion 38 of the pilot line through a male section 40 of a latch. A female section 41 of the latch is connected to plug 17 (FIG. 8) so that, as the pilot line is pulled in by drum member 26, the male section 40 mates securely with the female latch section 41 attached to plug member 17. Thereafter, the pick up line 34 is let out and tested for strength (at vessel position 41a); and, if the connection is satisfactory, the pick up line may be lowered to the seabed with a marker buoy 42 attached to its free end 44 using a blocker buoy 46 as the surface marker. The pilot line is then cut near the plug member, for example, by submarine 16, and the now free pilot line is completely wound onto drum member 26.

As noted above, the pipeline end section has previously been lowered by the repair frame and lies on the seabed with the plug member 17 secured at its prepared end 18. Plug member 17, in addition to providing a pick up point for the pick up line 34 also provides a watertight seal at end 18. The seal is not, however, absolute because the pipeline can be and preferably is dewatered or evacuated by expelling the fluid in the pipeline through a one-way, hydraulically actuated fluid passage in the plug member.

The fluids in the pipeline are expelled by installing a pig member (not shown) with a pinger (for tracking) in the pipeline (as described below) and using compressed air or gas to pump it until it reaches the pick up plug. The progress of the pig member may be tracked with hydrophones on a survey boat and its arrival at the plug member may be verified using the submersible vehicle equipped with the necessary acoustical detection equipment. The procedure for expelling fluids from the pipe member is described in detail in Nolan et al, U.S. Pat. No. 3,961,493, issued June 8, 1976, whose disclosure is incorporated herein by reference.

Figure 5A:
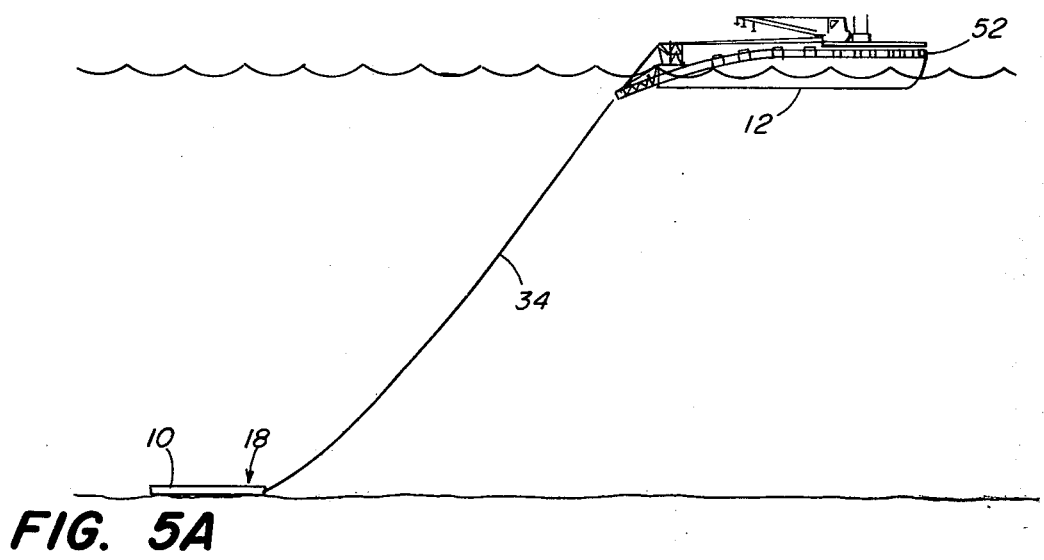
FIGS. 5A, 5B, 5C, schematically illustrate raising the pipeline member onto the pipelaying vessel after repair is completed.
Figure 5B:
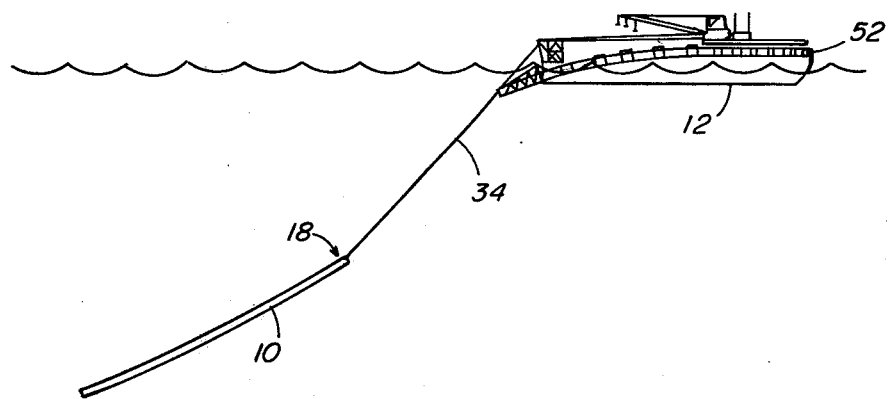
Figure 5C:
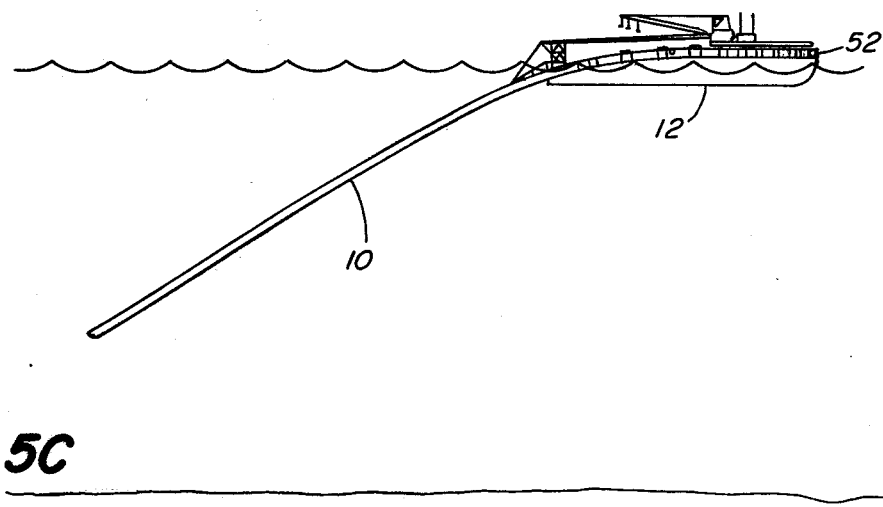

Referring to FIGS. 5A, 5B, and 5C, the buoy marked pick up cable or line 34 is picked up, preferably by the pipeline laying vessel 12, and is secured to a pick up winch 52 (FIG. 5A). Thereafter, winch 52 pulls in or takes up pick up cable 34 thereby raising pipeline 10 toward vessel 12 (FIG. 5B). As the pick up operation continues, the pipeline 10 is pulled onto vessel 12, and after it has been pulled a substantial distance onto the vessel (FIG. 5C), the pick up cable is severed, and the plug member is actuated to the insertion state in which it may be easily removed from end 18 of pipeline 10. Thereafter, the pipelaying operation may continue as it did before the buckle occurred.

PREPARING THE PIPELINE END SECTION FOR THE PLUG MEMBER

As noted above, after the pipeline buckle 14 has been located, for example, by a submarine 16, the damaged end section is prepared for receiving the plug member 17 by cutting off or severing the damaged portion and removing it from the vicinity of the pipeline 10.

The damaged end section can be cut or severed in any of a variety of ways. Preferably, an explosive cutoff device is used to quickly and cleanly sever the damaged pipeline section. An internal or an external charge is used depending upon the characteristics of the pipeline and upon the requirement placed on the end section. For example, an external charge such as that manufactured by Jet Research Center, (and described as a mechanized external linear shaped charge clamp, may be attached to the pipeline as described below and will leave a clean concentric pipe end having the original outside diameter but an approximately 3/16" "flash" on the inside diameter. Alternatively, an internal charge (manufactured by Jet Research Center) may be used which will leave a clean cut with no internal "flash" and a minimum external flash.

Referring to FIG. 6, when an internal charge is used, for example, on a pipeline having no concrete coating, the charge 58 may be installed in or attached to the aft portion of an internal cutoff pig 60. Pig 60 is placed in the pipeline at either an above water portion of the pipeline as shown in FIG. 2 at 64 or at a below water surface portion of the pipeline as shown in FIG. 7 at 68 and as described in U.S. Pat. No. 3,961,493 noted above.

Referring to FIG. 2, when the pig is launched from an above water surface pig launcher 70, the internal cutoff pig member 60 is preferably provided with an activated pinger so that the progress of the pig, through the pipeline, may be tracked. Thus, as the internal cutoff pig 60 is pumped through the pipeline using water pumps 72 until it reaches the buckle, at which point it will stop, its progress through the pipeline is monitored using the pinger (not shown) and hydrophones 73 on board a survey vessel, for example, vessel 74. The cutoff pig, after it reaches the pipeline buckle, can then be safely detonated, for example, by a coded acoustical trigger signal 76 from a transmitting device 78 supported by the vessel 74. Thereafter, a manned submersible 16 may inspect the cut; and if it conforms to required specifications, the vessel 74 may lower grapple hooks (not shown) to engage the severed damaged section of pipeline and pull it out of the pipeline right of way by walking the vessel 74 on its anchors. Alternatively, if the pig is to be recovered after the damaged section is severed, the submersible can "swim" a tag line from the surface to the bare end of the cutoff damaged section and hook or latch the line to the pig frame whereby the cutoff pig may be recovered. In this instance, the retrieval line is pulled at a shallow angle via a tug or auxiliary vessel (not shown) to disengage and retrieve the pig member.

Referring to FIG. 7, in those instances where the pig is launched beneath the surface of the water, a multiple subsea pig launcher 80 is used. The internal cutoff pig is installed in the multiple pig launcher as is described in U.S. Pat. No. 3,961,493 noted above, and an activated pinger is also provided for tracking purposes. The internal cutoff pig is then pumped through the pipeline until it reaches the buckle using hydraulic fluids supplied by a barge or other vessel 82 having the necessary air compressors and pumps to supply gas and water at the necessary pressures, through hoses 84. The progress of the pig through the pipeline is monitored as before by vessel 74 using hydrophones 73. After the cutoff pig has reached the pipeline buckle, it can be detonated, as before, by the coded acoustical trigger signal 76 from transmitting device 78 supported by vessel 74. The removal of the damaged end section proceeds substantially as described above in connection with FIG. 2, and if desirable, the cutoff pig may be recovered as noted above.

When the pipeline is surrounded by a concrete supporting coating or a concrete supporting coating having a light reinforcing construction, an external cutoff charge may be used, after the concrete coating in the "cutoff" zone has been removed by a "blanket" type charge as featured, for example, in Grundy, U.S. Pat. No. 3,999,483 issued July 30, 1975. However, unlike the situation wherein an internal charge can be pumped through the pipeline to the damaged section, the external charge must be secured in place by a manual operation. To assist in the placement of the charge, a cutoff frame member (not shown), similar to but smaller than the repair frame member 20, is provided. The cutoff frame, once in position, includes pipe grab members for lifting the damaged pipeline end section off the bottom of the seabed so that a mechanized external linear shaped charge clamp, for example, manufactured by Jet Research Center, can be lowered and centered around the pipe using, for example, hydraulically actuated cylinders. The charge clamp is thus secured to the damaged section as is well known in the art. Other auxiliary equipment could also be carried by the cutoff frame, for example, a hydraulically operated saw in a mechanized frame to aid during the cutting operation. As noted above, when fired, the external charge will leave a clean cut concentric pipe having the original outside diameter and an approximately 3/16" "flash" on the inside pipeline surface.

THE PLUG MEMBER AND THE REPAIR FRAME

Figure 8:
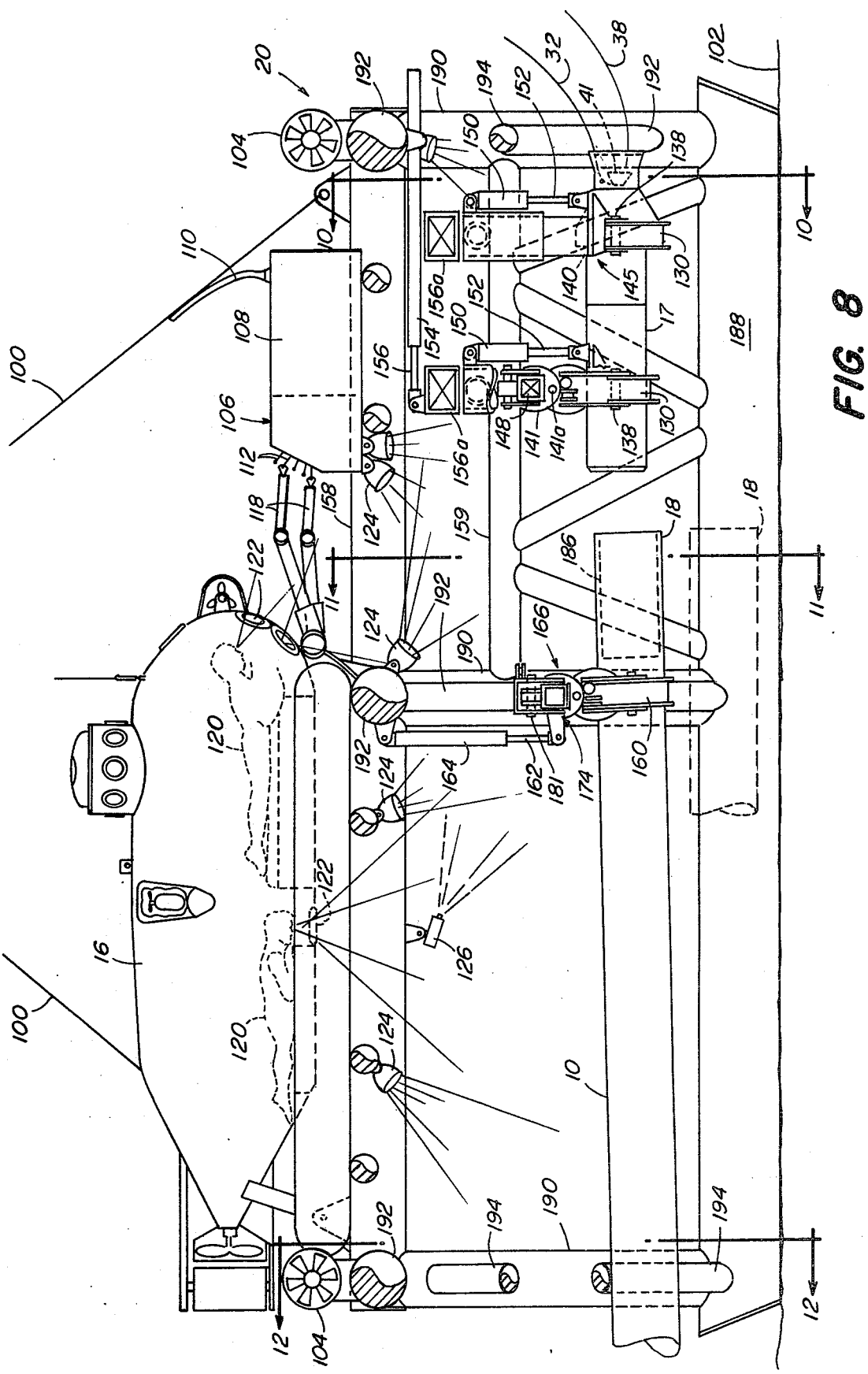
FIG. 8 is an elevation view, partially cut away, showing the repair frame during the repair operation.

Referring to FIG. 8, the repair frame 20 is lowered from a service vessel using support lines 100 into an operational relationship with prepared end section 18 of pipeline 10 on seabed 102. When the repair frame is lowered from the service vessel, it has secured thereto the plug member 17; and in the illustrated embodiment, the pilot line 32 is connected to the plug member during the lowering step. In order to provide the repair frame with maneuverability in addition to that provided by tethered support lines 100, the repair frame includes a plurality of thruster members 104 which are controlled by a manually operable control panel manipulating means 106. Thruster 104 may be hydraulically powered as is well known in the art. The manipulating means 106 includes a hydraulic power pack 108 which provides the power necessary to operate the hydraulic equipment carried by the repair frame. The manipulating means, including the hydraulic power pack, are provided with the required electrical and fluid power through an umbilical 110 from the service vessel.

Manipulating means 106 is provided with a plurality of manually controlled manipulating levers 112 which operate, for example, the thrusters, and which can be used to effect alignment under local or remote control of the plug and pipeline members. Levers 112 in a preferred embodiment are 4-way valves which, when two pistons are operated together, are load balance valves. Manipulating levers 112 may be operated by either a diver, if the depth at which the repair frame is submerged is not too great, or by the submersible vehicle 16 through appropriately controlled manipulating arms 118. Manipulating arms 118 are typically controlled by personnel 120 within the submersible vehicle 16. The personnel 120, looking through the portholes 122 and using the manipulating means 106, control the operation of the repair frame including plug insertion and the other operations which the repair frame is designed to accomplish. The repair frame is also equipped with lights 124 which provide sufficient visibility for the operations to be carried out safely and reliably under the control of personnel 120. In addition, the repair frame could, if necessary, be equipped with other aids such as swivel mounted television camera 126, sonar, etc., especially useful when the equipment is operated by remote control.

The plug member 17 preferably may be similar to the pig receiving members described in Nolan et al, U.S. Pat. No. 3,961,493, cited above. If desired, coupling means of the type described in United States Rochelle U.S. Pat. No. 3,645,563, issued Feb. 29, 1972 may be employed to couple member 17 and pipeline end 18. Plug 17 will be provided with means for attachment of the pilot line or pick up line to the plug member prior to the time when the repair frame is lowered from the service vessel. Plug member 17 includes, in particular, female latch section 41 and its related pilot line path defining member (described below).

Figure 9:
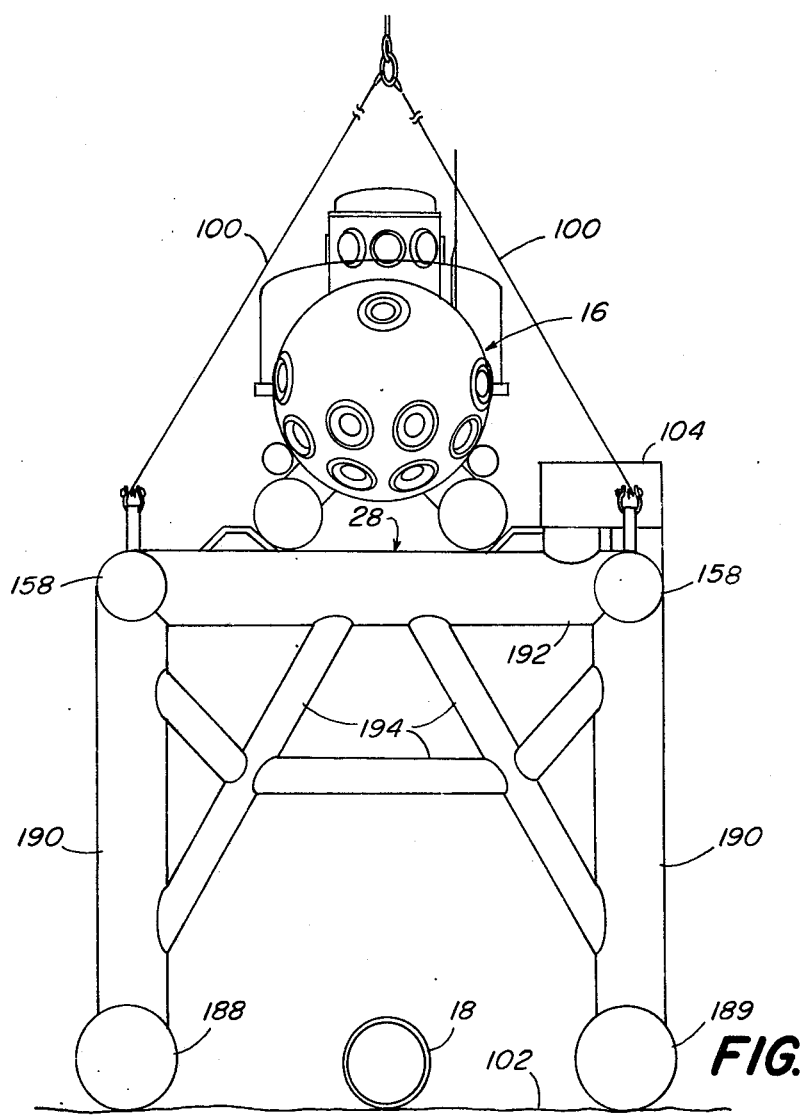
FIG. 9 is a simplified end view of a repair frame with several portions of the repair frame removed for the sake of clarity.

When the repair frame is brought into its operational relationship straddling pipeline 10 (FIG. 9), the submersible vehicle 16 will typically not be docked at the docking station 28 and the lowering operation proceeds by remote control. After the repair frame has been lowered into its operational position on the seabed 102, in the illustrated embodiment, the submersible vehicle 16 docks at docking station 28 and controls further operation of the elements of the frame through its manipulating means 118. As noted above, the plug member 17 and pilot line 32 had been secured to the repair frame prior to lowering it to the seabed.

Figure 10:
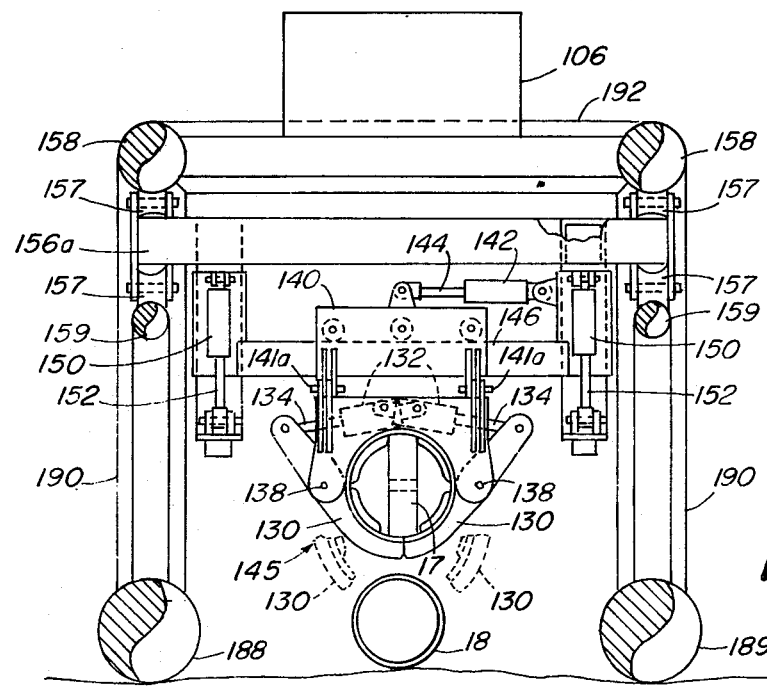
FIG. 10 is a cross section of the repair frame of FIG. 8 along lines 10—10.

Referring to FIG. 10, plug member 17 is securely held in the repair frame by two pairs of hydraulically operated grab or clamp members 130. Each clamp member 130 is connected to and is hydraulically operated by a cylinder 132 and rod 134 arrangement which pivots clamp 130 about pivot point 138 respectively. The entire plug member and its clamping assemblies are hingedly suspended from pick up plug transverse trolleys 140, 141 at hinge connections 141a. The pick up plug transverse trolleys move independently of each other and allow limited transverse motion of the plug member and its clamping assemblies. The movement of trolley 140 is controlled by a cylinder 142 and a piston rod 144. As the rod 144 moves in response to the pressures with cylinder 142, trolley 140, and hence the end clamp assembly 145, moves along tracks 146. A second cylinder and rod (not shown) control the transverse movement of trolley 141 along tracks 148. Tracks 146, 148 are each supported by a pair of cylinders 150 and piston rods 152 to provide limited independent vertical movement of the secured plug member. The entire plug-trolley assembly can then be moved longitudinally (in the general direction of the pipeline) by cylinder 154 and piston rod 156. In response to the movement of rod 156 by cylinder 154, the plug member 17 and the entire plug securing assembly (for movement in the transverse and vertical directions and supported by cross-support members 156a) is moved longitudinally along spool rollers 157 which support the plug securing assembly between structural members 158, 159. Thus, plug 17 can be positioned substantially in any of a limitless number of positions one of which will align the plug axis with the longitudinal axis of the pipeline end section 18, to which plug 17 may be engaged. Other configurations, of grab or clamp members, including means for varying their orientation, are described in Banjavich et al, U.S. Pat. No. 3,785,160, issued Jan. 15, 1974, whose disclosure is incorporated herein by reference.

Figure 11:
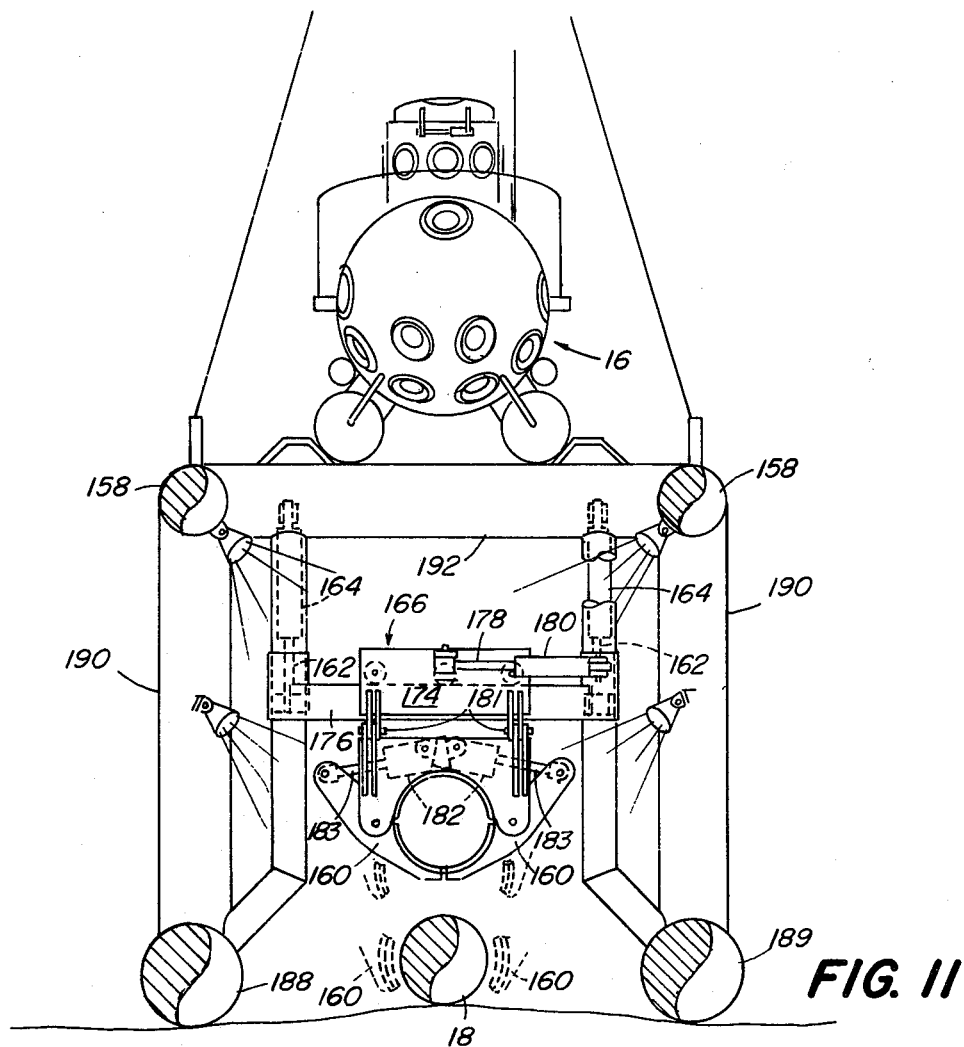
FIG. 11 is a second cross section of the repair frame of FIG. 8 along lines 11—11.

Referring to FIGS. 8 and 11, pipe grabs or clamps 160 extend downward, near the center of repair frame 20, to secure and elevate prepared end section 18 of pipeline 10. After the repair frame is in its operational relationship with pipeline 10, pipe clamps 160 are lowered by an assembly of two piston rods 162 and cylinders 164 to reach beneath the pipeline section 18 (FIG. 11) to secure and thereafter to raise the end section 18. Piston rods 162 are connected to a pipeline transverse track assembly 166 which comprises a pipeline transverse trolley assembly 174 moveable in a transverse direction on tracks 176 by a piston rod 178 and cylinder 180 assembly. Trolley assembly 174 hingedly supports at 181 a pair of cylinder 182 and piston rod 183 assemblies to open and close clamps 160.

Figure 12:
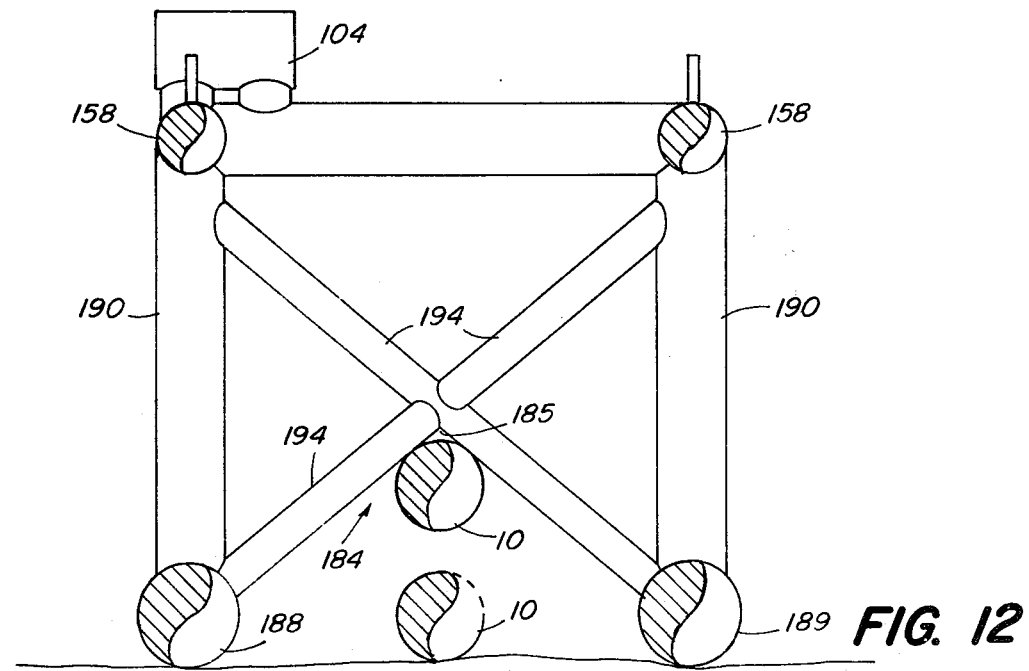
FIG. 12 is a cross section of the repair frame of FIG. 8 along lines 12—12 showing the alignment of the pipeline in the inverted V-shaped apex as it is being raised.

Thus, the hydraulically operated clamps 160 operate substantially in the same manner as did each of clamps 130 (which secured plug member 17). However, instead of using two sets of clamp members which are used to orient the plug member 17, only a single set of securing clamp members 160 is used to secure and align the pipeline. To achieve a known alignment for pipeline 10, therefore, the pipeline, as it is lifted, is guided against an inverted V-shaped structural section 184 of the repair frame (FIG. 12). The inverted V-shaped structural section has an apex 185 into which the pipeline 10 is guided and thus automatically aligns as it is being elevated or raised by the pipe holding assembly. Thus the pipeline assumes a known predetermined orientation and alignment with respect to the frame member.

After the pipeline is fully raised with a portion nestled in apex 185, the plug member 17 is inserted into the pipeline by moving the entire plug member along spool rollers 157 which, as noted above, support the plug member and its holder between structural members 158, 159 and against upward or downward vertical movement. The plug member is then moved toward and into pipeline end section 18 as shown in phantom at 186 (FIG. 8). Thereafter, hydraulically actuatable and expandable plug seals and grips (not shown) as featured in the above noted Rochelle U.S. Pat. No. 3,645,563, may be actuated to secure the pipeline plug member 17 in a fluid-tight seal arrangement within end section 18 of pipeline 10. Of course, plug 17 could alternatively be telescoped over end 18 or abuttingly engaged therewith.

The repair frame skeletal structure comprises a plurality of elongated tubular supports. The repair frame rests on two tubular members 188, 189 from which a plurality of vertically extending tubular members 190 are positioned. The plurality of horizontal top tubular members 158 extend between and connect vertical members 190 in a longitudinal direction and a plurality of horizontal top transverse members 192 connect vertical members 190 in the transverse direction. A plurality of smaller support tubular members, for example members 194, provide additional support and structural reliability for the repair frame, and with respect to the pipeline member, provide the inverted V-shaped structure which provides one alignment position for the pipeline member as it is being raised from the seabed.

After the plug member is inserted into the end section 18 of pipeline 10, the pipeline 10 is dewatered. This may be performed according to the method and apparatus described in U.S. Pat. No. 3,961,493 cited above, which describes apparatus for purging a pipeline using a pipeline pig member which passes from a first end of the pipeline through the interior of the pipeline to a second end. In the preferred embodiment of the invention, plug member 17 acts as a pig receiver according to U.S. Pat. No. 3,961,493, and includes means for exhausting fluids displaced by the second pig member and for receiving the second pig element as described in U.S. Pat. No. 3,961,493.

RAISING THE PIPELINE

After the pipeline has been dewatered, the flexible line 24, if it is not a sufficiently heavy duty line for picking up the pipeline, is replaced by a pick up, heavy duty service cable as described before in connection with FIG. 4. Referring particularly to FIGS. 1, 4, and 7, the lines connected to the repair frame are preferably configured, prior to lowering the repair frame into operational relationship with the pipeline, so that as the pilot line 32 is connected at one end to drum winch 26 on the barge or vessel 22, with a portion 38 which has been threaded through the latch member 41 on the repair frame. The portion 38 of the pilot line 32 is connected to the cable or pick up line 34 secured to a drum winch 198 on vessel 36. Heavy duty pick up line or service cable 34 is connected to pilot line portion 38, through the male latch section 40 which, in the preferred embodiment, will securely mate with and latch to the female latch section 41 secured to the plug member 17. When the pilot line is thereafter wound around drum winch member 26, the male latch section 40 automatically mates with and thereafter is secured to female section 41. Thereafter, as noted earlier, the submersible vessel 16 may cut the pilot line 32 near the plug member, the remainder of the pilot line being wound around drum 26. Vessel 36 then tests the pick up line by exerting a predetermined tension on it, and if line 34 is satisfactorily secured, the pick up line is left on the seabed for later pick up by the pipelaying vessel. The pick up techniques used by the pipelaying vessel are well known in the art and will not be discussed further here.

UNOBVIOUSNESS AND THE ADVANTAGES OF THE INVENTION

The method and apparatus of the invention provide a novel and unobvious approach for repairing pipeline beneath the water at depths below which divers cannot easily maneuver or work. By providing the plug member in a secure position on the repair frame prior to and during lowering, (with or without the pilot line connected thereto), the invention advantageously eliminates certain possibly dangerous and complex steps and provides the user with a method and apparatus which is more reliable and practical than that which was previously known.

The further inclusion of a manually controlled manipulator means which may be operated by either a diver or a submersible further provides advantageous flexibility whereby the repair frame may also be used without a submersible vehicle at depths shallower than heretofore contemplated for this class of apparatus. Thus, the invention advantageously provides a repair frame which can be controlled by either a manned or remotely controlled submersible or a diver.

The invention further advantageously provides horizontal thrusting devices to prevent small water forces from affecting the position and orientation of the repair frame. The invention also provides novel and simple methods and apparatus for aligning the pipeline member and the plug member.

The claimed invention is both novel and unobvious; however, there exist several references such as Robley, U.S. Pat. No. 3,267,682, issued Aug. 23, 1966; and Meister et al, U.S. Pat. No. 3,578,233, issued May 11, 1971, which disclose the concept of lowering frame structures having pipe sections attached thereto. In addition, there is an Offshore Technology Conference paper, No. OTC 2681 entitled "Development of an Unmanned Deepwater Pipeline Repair System", by Bline and McDonald (1976) which discloses the design of a repair frame for use on the seabed and which carries a connecting pipeline having hydroball couplings attached at either end thereof. (See also, Kelly et al, U.S. Pat. No. 4,014,180, issued Mar. 29, 1977.) The references, however, do not contemplate the use of the repair frame having secured thereto prior to being lowered a pipeline plug member with or without a flexible line or cable connecting the member with a floating vessel.

There are other references which disclose the concept of providing thruster type manipulators to control maneuvering of a repair frame. For example, the Meister et al patent noted above describes providing thrusters, mounted on a repair frame, to control maneuvering of the frame. In addition, other references relating to dockable control and repair units are Tryon, U.S. Pat. No. 3,987,741, issued Oct. 26, 1976, and Marquinez, U.S. Pat. No. 3,990,377, issued Nov. 9, 1976.

Other references disclose the use of arcuate guide members secured to the frame structure for aligning the pipeline; however, they do not disclose the inverted V-shaped structural arrangement to position the pipeline using straight structural members. (See, for example, Gilman, U.S. Pat. No. 3,658,231, issued Apr. 25, 1972.)

The use of explosive cutoff devices is generally described in Grundy, U.S. Pat. No. 3,999,483, which issued to Jet Research Center, Inc. as the assignee, on July 30, 1975.

In addition to the above references, many references such as McCarron, U.S. Pat. No. 3,525,226, issued Aug. 25, 1970, disclose rather complex systems wherein a pig is forced through a pipeline and after it reaches the end of the pipeline, a pilot line or pick up line is released from the pig for later pick up. These references disclose a complex apparatus and a complex series of operations. It is this kind of complexity that the disclosed and claimed invention eliminates.

Thus, several aspects of the disclosed invention are mentioned or disclosed in prior patent and other reference literature. Nevertheless, the unique combination provided in the claimed invention combines elements, some of which are not disclosed or suggested by the prior art, and provides a method and apparatus for underwater repair which has significant advantages not available or obvious in the prior art devices and methods. In addition, several of the complex and undesirable method steps and apparatus disclosed by the prior references are eliminated. Thus, the claimed invention uniquely combines elements and method steps to provide an overall method and apparatus for repairing underwater pipeline which is not only superior to the prior art apparatus and methods, but which provides a unique interrelation of apparatus and function which surpasses in both operation and result mere combinations of methods and apparatus taught or suggested by the prior art references.

Other embodiments of the invention including additions, subtractions, deletions, and other modifications of the various embodiments disclosed herein, would be obvious to those skilled in the art and are within the ambit of the following claims.

What is claimed is:

1. A method for repairing a damaged pipeline member on the bottom of a body of water comprising the steps of locating the damaged section of said pipeline member, preparing said damaged pipeline for receiving a pipeline plug section at a pipeline end section, securing the pipeline plug member to a submersible unitary repair frame, lowering the repair frame from a floating vessel into an operational relationship with the prepared pipeline end section with the plug member secured thereto, said prepared end section being in a non-aligned position relative to said plug member, aligning the plug member and the pipeline end section with each other using said unitary repair frame, inserting said plug member into said pipeline end section, securing said plug member in said pipeline end section, raising said unitary repair frame out of said operational relationship and away from said pipeline leaving said pipeline free to be raised, and raising said pipeline end section onto a floating vessel.

2. The method of claim 1 further including the steps of attaching a flexible line between said plug member and a surface vessel prior to said lowering step, and maintaining said plug member with the flexible line connected thereto in its secured position during said lowering step.

3. The method of claim 2 wherein said pipeline raising step includes the step of replacing said flexible line with a pick up line for lifting said pipeline end section from said water bottom and onto said vessel.

4. The method of claim 1 wherein said aligning step includes the step of elevating said pipeline end section above the water bottom and against an inverted V-shaped section of said repair frame to place said pipeline in a known, predetermined alignment position.

5. The method of claim 1 wherein said preparing step includes the step of explosively cutting said damaged pipeline at said damaged section to prepare said damaged section for receiving the pipeline plug member.

6. The method of claim 5 wherein said explosive cutting step includes the step of placing an explosive on the exterior portion of said damaged pipeline.

7. The method of claim 5 wherein said explosive cutting step includes the step of cutting the pipeline from an interior of said damaged pipeline using an internal cutoff pig.

8. The method of claim 1 further including the step of providing a plurality of thrusters on said frame to assist in the frame lowering step.

9. The method of claim 1 further including the step of evacuating water from said pipeline member through said plug member.

10. A method for repairing a damaged pipeline member lying on the bottom of a body of water comprising the steps of
lowering a cutoff frame member from a floating vessel into an operating relationship with the damaged pipeline section,
lifting an end of the damaged pipeline off the water bottom using said cutoff frame,
attaching a mechanized external linear shaped charge clamp to the damaged pipeline,
detonating the charge clamp,
removing the damaged section from the vicinity of the pipeline leaving a prepared pipeline end section,
raising the cutoff frame member away from its operational relationship with the pipeline,
securing a pipeline plug member to a submersible repair frame,
attaching a flexible line between the plug member and a surface vessel,
lowering the repair frame from a floating vessel into an operational relationship with the prepared pipeline end section, the frame maintaining the plug member and the flexible line in its secured position during the lowering step,
providing a manual control panel manipulating means on the frame for controlling operations of the frame,
providing a submersible vehicle having means to operate the manual manipulating means,
aligning the pipeline plug member with the pipeline end section,
inserting the plug member into the pipeline end section,
securing the plug member in the pipeline end section,
evacuating water from the pipeline member by expelling the water through a closeable passage in the plug member,
replacing the flexible line with a pick up line for lifting the pipeline section from the water bottom and onto the surface vessel, and
raising the pipeline end section with the plug member secured therein onto the surface vessel.

11. A method for repairing a damaged pipeline member lying on the bottom of a body of water comprising the steps of
installing an internal pig in the pipeline, the pig having an activated pinger and an explosive cutting charge,
pumping the cutoff pig through said pipeline until it reaches and stops at the damaged pipeline section,
tracking the internal pig during the pumping step,
cutting off a damaged end portion of said pipeline member using said explosive charge leaving a prepared pipeline end section in condition for receiving a pipeline plug member,
removing the damaged end portion from the immediate vicinity of the pipeline end section,
securing the pipeline plug member to a submersible repair frame,
attaching a flexible line between the plug member and a surface vessel,
lowering the repair frame from a floating vessel into an operational relationship with the prepared pipeline end section, the frame maintaining the plug member and flexible line in its secured position during the lowering step,
providing a manual control panel manipulating means on said frame for controlling operation of the frame and for aligning the pipeline plug member with and for inserting the pipeline plug member into the pipeline end section,
providing a submersible vehicle having means to operate said manual manipulating means,
aligning the plug member and the pipeline end section with each other,
inserting the plug member into said pipeline end section,
securing the plug member in the pipeline end section,
evacuating water from said pipeline member by expelling the water through a closeable passage in said plug member,
replacing said flexible line with a pick-up line for lifting the pipeline section from the water bottom and onto said surface vessel, and
raising the pipeline end section with the plug member secured therein onto said surface vessel.

12. Apparatus for effecting repair of a damaged pipeline member lying on the bottom of a body of water comprising
means for locating a damaged portion of said pipeline member,
means for cutting away said damaged portion of said pipeline member leaving at least a prepared pipeline end section exposed to the water environment,
a pipeline plug member having an outside diameter smaller than the inside diameter of the pipeline member in a first insertion state and having actuatable means for securing the plug within the pipeline in a second secured state, said plug including means for securing a flexible line thereto,
a submersible repair frame having
means for securely holding said pipeline plug,
means for raising and securely holding said pipeline end section in a known position,
means for orienting and aligning said pipeline plug in an axial alignment with the raised and secured pipeline section, and
means for inserting the plug member into the aligned pipeline end section,
at least one floating vessel, and
means for lowering said repair frame with said plug member secured thereto to the bottom of said body of water in an operative relation to said pipeline end section.

13. The apparatus of claim 12 including
a manually operable control panel manipulation means for controlling operation of the repair frame including said raising, holding, orienting, and inserting means, and
a submersible vehicle docking station to position a submersible vehicle in an operative relationship to the control panel manipulation means,
said submersible vehicle having means for operating the control panel manipulation means.

14. The apparatus of claim 12 including
a flexible line connected between said floating vessel and said pipeline plug securing means.

15. The apparatus of claim 12 wherein said means for locating said damaged portion comprises
an internal pig, means for pumping said internal pig through the pipeline until it reaches and stops at the damaged pipeline section, and means to track said internal pig as it traverses said pipeline.

16. The apparatus of claim 15 wherein said cutting means comprises an internal shaped charge located in an after portion of the internal pig for cutting, in response to an external control command, the damaged portion of said pipeline member.

17. The apparatus of claim 12 wherein said repair frame further includes
a plurality of thrusters to aid in aligning the repair frame as it is lowered to the water bottom.

18. The apparatus of claim 12 wherein said cutting means comprises
a cutoff frame member, said cutoff frame member having
means for lifting an end of said damaged end section from said water bottom, and
said apparatus further includes means for lowering and raising the cutoff frame member to and away from its operating relationship with the pipeline.

19. The apparatus of claim 18 wherein said means for cutting said damaged section further comprises
a mechanized external linear shaped charge clamp for cutting off said damaged pipeline section.

20. The apparatus of claim 12 further including means for evacuating water from said pipeline member through said plug member.

21. The apparatus of claim 12 wherein said plug member comprises
means for securing said plug member to an internal contour surface of said pipeline,
means to allow water from within said pipeline to be expelled through a closeable plug passage to the outside environment.

22. The apparatus of claim 13 wherein said control panel manipulating means includes a plurality of four-way valves, said valves using load balance valves where two pistons operate together.

23. The apparatus of claim 13 wherein said submersible vehicle is a manned one-atmosphere vehicle.

24. The apparatus of claim 12 wherein said repair frame further comprises
an inverted V-shaped structural section within which the pipeline is automatically aligned as it is elevated above the water bottom.

25. Apparatus for effecting repair of a damaged pipeline member lying on the bottom of a body of water comprising
an internal pig,
means attached to an after portion of said pig for explosively cutting said pipeline member,
means for pumping the internal pig through the pipeline until it reaches the damaged pipeline section,
means to track the internal pig as it traverses the pipeline,
a pipeline plug member having an outside diameter smaller than the pipeline member inside diameter during a first insertion state and having actuatable means for securing the plug within the pipeline in a second secured state,
a submersible repair frame having
means for raising and securely holding the pipeline end section, said means including an inverted V-shaped structural section against which the pipeline is aligned as it is raised,
means for orienting and aligning the pipeline plug in an axial alignment with the raised and secured pipeline section,
means for inserting the plug member into the aligned pipeline end section,
a manually operable control panel manipulation means for controlling operation of the repair frame, including the raising, holding, orienting, and inserting means, and
a submersible vehicle docking station to position a submersible vehicle in an operative relationship to the control panel manipulation means,
said submersible vehicle being a manned, one-atmosphere submersible vehicle having means to operate the manual manipulation means,
at least one floating vessel,
a flexible line connected between the floating vessel and the pipeline plug,
means for lowering the repair frame with the plug and connected line secured thereto to the bottom of the body of water into an operative relationship to the pipeline end section,
means for securing the plug member to an internal contour surface of the pipeline,
means for evacuating water through a plug passage in the pipeline plug member from said pipeline to the outside water environment,
means for raising said repair frame from the vicinity of its operative relationship to said pipeline end section, and
means for raising the pipeline end section onto said one floating vessel.

26. Apparatus for effecting repair of the damaged pipeline member lying on the bottom of a body of water comprising
a cutoff frame member having
means for lifting an end of the damaged pipeline above the water bottom, and
means for cutting the damaged end section from the pipeline to provide a prepared pipeline end section exposed to the water environment,
means for lowering and raising the cutoff frame member to and away from its operating relationship with the pipeline,
a pipeline plug member having an outside diameter smaller than the pipeline member inside diameter during a first insertion state and having actuatable means for securing the plug within the pipeline in a second secured state,
a submersible repair frame having
means for raising and securely holding the pipeline end section, said means including an inverted V-shaped structural section against which the pipeline is aligned as it is raised,
means for orienting and aligning the pipeline plug in an axial alignment with the raised and secured pipeline section,
means for inserting the plug member into the aligned pipeline end section,
a manually operable control panel manipulation means for controlling operation of the repair frame, including the raising, holding, orienting, and inserting means, and
a submersible vehicle docking station to position a submersible vehicle in an operative relationship to the control panel manipulation means, said submersible vehicle being a manned, one-atmosphere submersible vehicle having means to operate the manual manipulation means, at least one floating vessel, a flexible line connected between the floating vessel and the pipeline plug, means for lowering the repair frame with the plug and connected line secured thereto to the bottom of the body of water into an operative relationship to the pipeline end section, means for securing the plug member to an internal contour surface of the pipeline, means for evacuating water through a plug passage in the pipeline plug member from said pipeline to the outside water environment, means for raising said repair frame from the vicinity of its operative relationship to said pipeline end section, and means for raising the pipeline end section onto said one floating vessel.

27. A submersible repair frame for connecting a line to a prepared pipeline end section to raise the end section from a bottom of a body of water comprising means for securely holding a pipeline plug member having an outside diameter smaller than the inside diameter of the pipeline end section in a first insertion state, said plug having an actuatable means for securing the plug within the pipeline end section in a second secured state, means for raising and securely holding the pipeline end section in a known alignment position, means for orienting and aligning the pipeline plug member in an axial alignment with the raised and secured pipeline section, means for inserting the plug member into the aligned pipeline end section, and said pipeline plug member including line connection means for receiving and holding a flexible line, whereby said flexible line can be used to raise the pipeline end section from the bottom of the body of water.

28. The repair frame of claim 27 wherein said repair frame further comprises a manual operable control panel manipulation means for controlling operation of the repair frame including the raising, holding, orienting, and inserting means, and a submersible vehicle docking station for positioning a submersible vehicle in an operative relation to the control panel manipulation means, whereby said submersible vehicle can operate the control panel manipulation means.

29. The repair frame of claim 28 wherein the repair frame further comprises a transversely directed, inverted V-shaped structural section within which the pipeline end section is automatically aligned as it is elevated above the water bottom.

30. The repair frame of claim 27 wherein said repair frame further comprises a plurality of thrusters to aid in aligning the repair frame when it is lowered to the bottom of the body of water.

31. A method for repairing a damaged pipeline member on the bottom of a body of water comprising the steps of locating the damaged section of said pipeline member, preparing said damaged pipeline for receiving a pipeline plug section at a pipeline end section, securing the pipeline plug member to a submersible repair frame, providing a manual control panel manipulating means on said frame for controlling operation of said frame and for aligning said pipeline plug member with and for inserting said pipeline plug member into said pipeline end section, providing a submersible vehicle having means to operate said manual manipulating means, lowering the repair frame from a floating vessel into an operational relationship with the prepared pipeline end section with the plug member secured thereto, aligning the plug member and the pipeline end section with each other, inserting said plug member into said pipeline end section, securing said plug member in said pipeline end section, raising said repair frame out of said operational relationship and away from said pipeline, and raising said pipeline end section onto a floating vessel.

32. The method of claim 31 wherein said submersible vehicle is a manned submersible vehicle.

33. The method of claim 31 including the step of docking said submersible vehicle on said frame.

34. A method for repairing a damaged pipeline member on the bottom of a body of water comprising the steps of locating the damaged section of said pipeline member, preparing said damaged pipeline for receiving a pipeline plug section at a pipeline end section by explosively cutting said damaged pipeline at said damaged section to prepare said damaged section for receiving the pipeline plug member, said cutting step including the steps of installing an internal cutoff pig in the pipeline with an activated pinger, pumping said cutoff pig through said pipeline until it reaches the damaged pipeline section, and tracking said cutoff pig during the pumping step, securing the pipeline plug member to a submersible repair frame, lowering the repair frame from a floating vessel into an operational relationship with the prepared pipeline end section with the plug member secured thereto, aligning the plug member and the pipeline end section with each other, inserting said plug member into said pipeline end section, securing said plug member in said pipeline end section, raising said repair frame out of said operational relationship and away from said pipeline, and raising said pipeline end section onto a floating vessel.

35. A method for reparing a damaged pipeline member on the bottom of a body of water comprising the steps of locating the damaged section of said pipeline member, preparing said damaged pipeline for receiving a pipeline plug section at a pipeline end section by lowering a cutoff frame member from a floating vessel into an operating relationship with the damaged pipeline section, lifting an end of said damaged pipeline off the water bottom using said cutoff frame, removing said damaged section from said pipeline, and raising said cutoff frame member away from its operating relationship with the pipeline, securing the pipeline plug member to a submersible repair frame, lowering the repair frame from a floating vessel into an operational relationship with the prepared pipeline end section with the plug member secured thereto, aligning the plug member and the pipeline end section with each other, inserting said plug member into said pipeline end section, securing said plug member in said pipeline end section, raising said repair frame out of said operational relationship and away from said pipeline, and raising said pipeline end section onto a floating vessel.

36. The method of claim 35 wherein said removing step comprises the steps of attaching a mechanized external linear shaped charge clamp to said damaged pipeline, between the damaged section and the remainder of the pipeline, and detonating said charge clamp.

* * * * *